United States Patent
Sodagar

(10) Patent No.: US 11,782,751 B2
(45) Date of Patent: Oct. 10, 2023

(54) METHOD AND APPARATUS FOR IMPROVEMENTS TO MOVING PICTURE EXPERTS GROUP NETWORK BASED MEDIA PROCESSING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 209 days.

(21) Appl. No.: 16/848,202

(22) Filed: Apr. 14, 2020

(65) Prior Publication Data

US 2020/0341803 A1 Oct. 29, 2020

Related U.S. Application Data

(60) Provisional application No. 62/839,509, filed on Apr. 26, 2019.

(51) Int. Cl.
*G06F 9/48* (2006.01)
*G06F 9/50* (2006.01)
(Continued)

(52) U.S. Cl.
CPC .............. *G06F 9/48* (2013.01); *G06F 9/485* (2013.01); *G06F 9/4806* (2013.01);
(Continued)

(58) Field of Classification Search
CPC ........ G06F 9/48; G06F 9/4806; G06F 9/4843; G06F 9/485; G06F 9/4881; G06F 9/50; G06F 9/5005; G06F 9/5011; G06F 9/5027; G06F 9/5038; G06F 9/5044; G06F 9/5055; G06F 9/5061; G06F 9/5072;
(Continued)

(56) References Cited

U.S. PATENT DOCUMENTS

| | | | | |
|---|---|---|---|---|
| 2012/0331472 A1* | 12/2012 | Moon | ...................... | G06F 16/29 718/102 |
| 2015/0039764 A1* | 2/2015 | Beloglazov | ............. | H04L 47/70 709/226 |

(Continued)

OTHER PUBLICATIONS

Wang et al, "MP-Tomasulo: A Dependency-Aware Automatic Parallel Execution Engine for Sequential Programs", ACM Transactions on Architecture and Code Optimization, vol. 10, No. 2, Article 9, Publication date: May 2013. pp. 1-26 (Year: 2013).*

(Continued)

*Primary Examiner* — Charles M Swift
(74) *Attorney, Agent, or Firm* — Sughrue Mion, PLLC

(57) ABSTRACT

A method of processing media content in Moving Picture Experts Group (MPEG) Network Based Media Processing (NBMP) may include obtaining, from an NBMP source, a workflow having a workflow descriptor (WD) indicating a workflow descriptor document (WDD); based on the workflow, obtaining a task having a task descriptor (TD) indicating a task descriptor document (TDD); based on the task, obtaining, from a function repository, a function having a function descriptor (FD) indicating a function descriptor document (FDD); and processing the media content, using the workflow, the task, and the function.

20 Claims, 7 Drawing Sheets

(51) Int. Cl.
*H04L 67/10* (2022.01)
*G06F 16/953* (2019.01)

(52) U.S. Cl.
CPC .......... *G06F 9/4843* (2013.01); *G06F 9/4881* (2013.01); *G06F 9/50* (2013.01); *G06F 9/5005* (2013.01); *G06F 9/5011* (2013.01); *G06F 9/5027* (2013.01); *G06F 9/5044* (2013.01); *G06F 9/5055* (2013.01); *G06F 9/5061* (2013.01); *G06F 9/5072* (2013.01); *G06F 16/953* (2019.01); *H04L 67/10* (2013.01)

(58) Field of Classification Search
CPC ....... G06F 16/953; H04L 67/02; H04L 67/10; H04L 67/16; H04L 41/0826; H04L 41/0889; H04L 41/0893
See application file for complete search history.

(56) References Cited

U.S. PATENT DOCUMENTS

| | | | |
|---|---|---|---|
| 2015/0261748 A1* | 9/2015 | Sng ........................ | G06F 16/93 707/608 |
| 2017/0374161 A1* | 12/2017 | Chrysanthakopoulos ................... | G06F 3/0647 |
| 2018/0349183 A1* | 12/2018 | Popovic .............. | H04L 41/0806 |
| 2019/0222621 A1* | 7/2019 | Kolan .................. | G06F 9/5055 |
| 2019/0222988 A1* | 7/2019 | Maes .................. | H04L 61/1511 |
| 2019/0391845 A1* | 12/2019 | Gasser ................. | G06F 9/4887 |
| 2020/0304508 A1* | 9/2020 | Bae ...................... | H04L 63/20 |
| 2021/0216359 A1* | 7/2021 | Rana ..................... | G06Q 10/10 |
| 2022/0164453 A1* | 5/2022 | Kammachi Sreedhar ................... | H04L 63/205 |

OTHER PUBLICATIONS

Systems, "Potential enhancements for Network-based Media Processing", International Organisation for Standardisation, ISO/IEC JTC 1/SC 29/WG 11, Coding of moving pictures and audio Convenorship: UNI (Italy), Mar. 2019, N18401 pp. 1-106 (total 116 pages).

* cited by examiner

METHOD AND APPARATUS FOR IMPROVEMENTS TO MOVING PICTURE EXPERTS GROUP NETWORK BASED MEDIA PROCESSING

CROSS-REFERENCE TO RELATED APPLICATION

This application claims priority from U.S. Provisional Patent Application No. 62/839,509, filed on Apr. 26, 2019, in the U.S. Patent and Trademark Office, the disclosure of which is incorporated herein by reference in its entirety.

BACKGROUND

The Moving Picture Experts Group (MPEG) Network Based Media Processing (NBMP) project has developed a concept of processing media on cloud. However, current NBMP design does not provide an application program interface (API) abstraction for network management. Current NBMP design only provides APIs for cloud resources such as a hardware platform.

SUMMARY

According to embodiments, a method of processing media content in Moving Picture Experts Group (MPEG) Network Based Media Processing (NBMP) is performed by at least one processor, and includes obtaining, from an NBMP source, a workflow for processing the media content, the workflow having a workflow descriptor (WD) indicating a workflow descriptor document (WDD); based on the workflow, obtaining a task for processing the media content, the task having a task descriptor (TD) indicating a task descriptor document (TDD); based on the task, obtaining, from a function repository storing one or more functions for processing the media content, at least one among the one or more functions, each of the at least one among the one or more functions having a function descriptor (FD) indicating a function descriptor document (FDD); and processing the media content, using the workflow, the task, and the at least one among the one or more functions.

According to embodiments, an apparatus for processing media content in Moving Picture Experts Group (MPEG) Network Based Media Processing (NBMP) includes at least one memory configured to store program code; and at least one processor configured to read the program code and operate as instructed by the program code, which includes first obtaining code configured to cause the at least one processor to obtain, from an NBMP source, a workflow for processing the media content, the workflow having a workflow descriptor (WD) indicating a workflow descriptor document (WDD); second obtaining code configured to cause the at least one processor to obtain, based on the workflow, a task for processing the media content, the task having a task descriptor (TD) indicating a task descriptor document (TDD); third obtaining code configured to cause the at least one processor to obtain, based on the task, from a function repository storing one or more functions for processing the media content, at least one among the one or more functions, each of the at least one among the one or more functions having a function descriptor (FD) indicating a function descriptor document (FDD); and processing code configured to cause the at least one processor to process the media content, using the workflow, the task, and the at least one among the one or more functions.

According to embodiments, a non-transitory computer-readable medium stores instructions that, when executed by at least one processor of an apparatus for processing media content in Moving Picture Experts Group (MPEG) Network Based Media Processing (NBMP), cause the at least one processor to obtain, from an NBMP source, a workflow for processing the media content, the workflow having a workflow descriptor (WD) indicating a workflow descriptor document (WDD); based on the workflow, obtain a task for processing the media content, the task having a task descriptor (TD) indicating a task descriptor document (TDD); based on the task, obtain, from a function repository storing one or more functions for processing the media content, at least one among the one or more functions, each of the at least one among the one or more functions having a function descriptor (FD) indicating a function descriptor document (FDD); and process the media content, using the workflow, the task, and the at least one among the one or more functions.

DETAILED DESCRIPTION

Embodiments described herein provide functional improvements to the MPEG NBMP standard. Such improvements increase media processing efficiency, increase speed and lower cost of deployment of media services, and allow large scale deployment of media services by leveraging public, private or hybrid cloud services.

In examples, the functional improvements to the MPEG NBMP standard include a harmonization of Workflow, Task and Functions, and defining a one-to-one relationship between logical items, data documents and REST resources for each of them. Access to main and basic descriptors may be enabled by creating representational state transfer (REST) resources for every descriptor. Also, a Task Descriptor may be added to a Workflow Descriptor, so that the Workflow descriptor can capture the complete and full picture of a workflow and no additional information is needed to build or examine the workflow.

In addition, a Task life-cycle state may be added as a parameter to a Task's General Descriptor, so that Task Descriptor may also capture the state of each Task and the state information may be retrieved using existing NBMP Workflow and TASK APIs. Examples also may including improving NBMP API design by making them REST APIs. The request and responses may be re-defined to comply with a REST concept, and therefore achieve the benefits of REST.

In addition, embodiments may simplify the function discovery operation by making it a query-string search, and allow multiple key-value pairs to be added in query string, enabling more extensive and powerful search compared to the current NBMP design.

Figure 1:
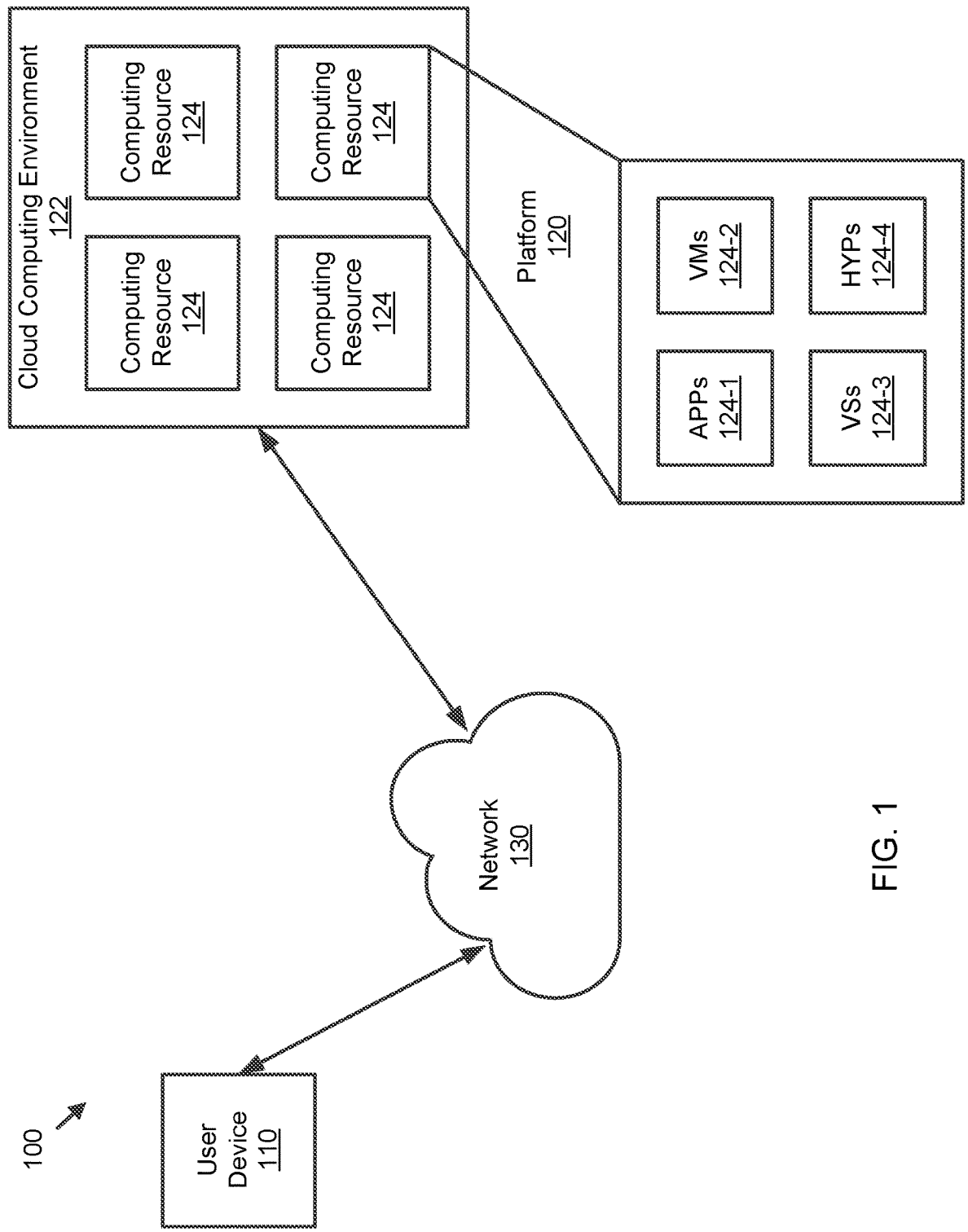
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
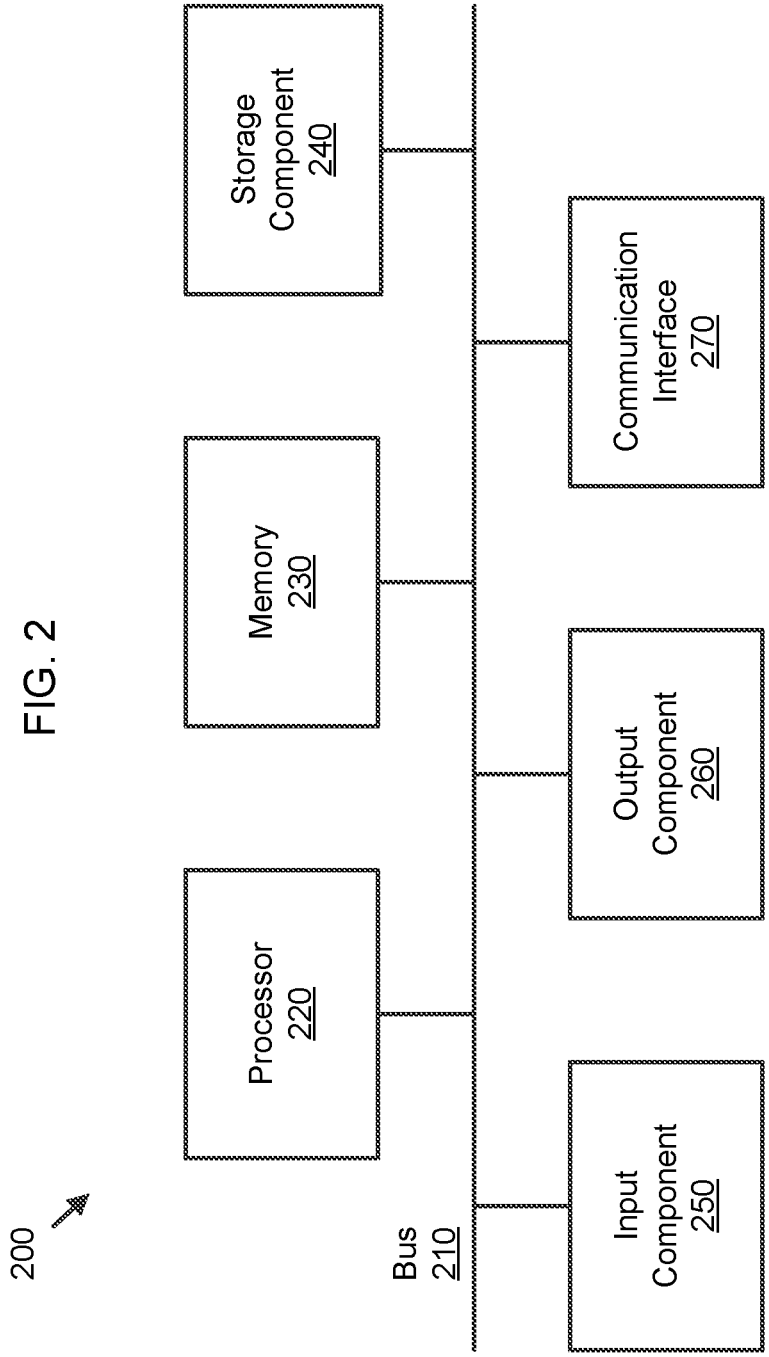
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
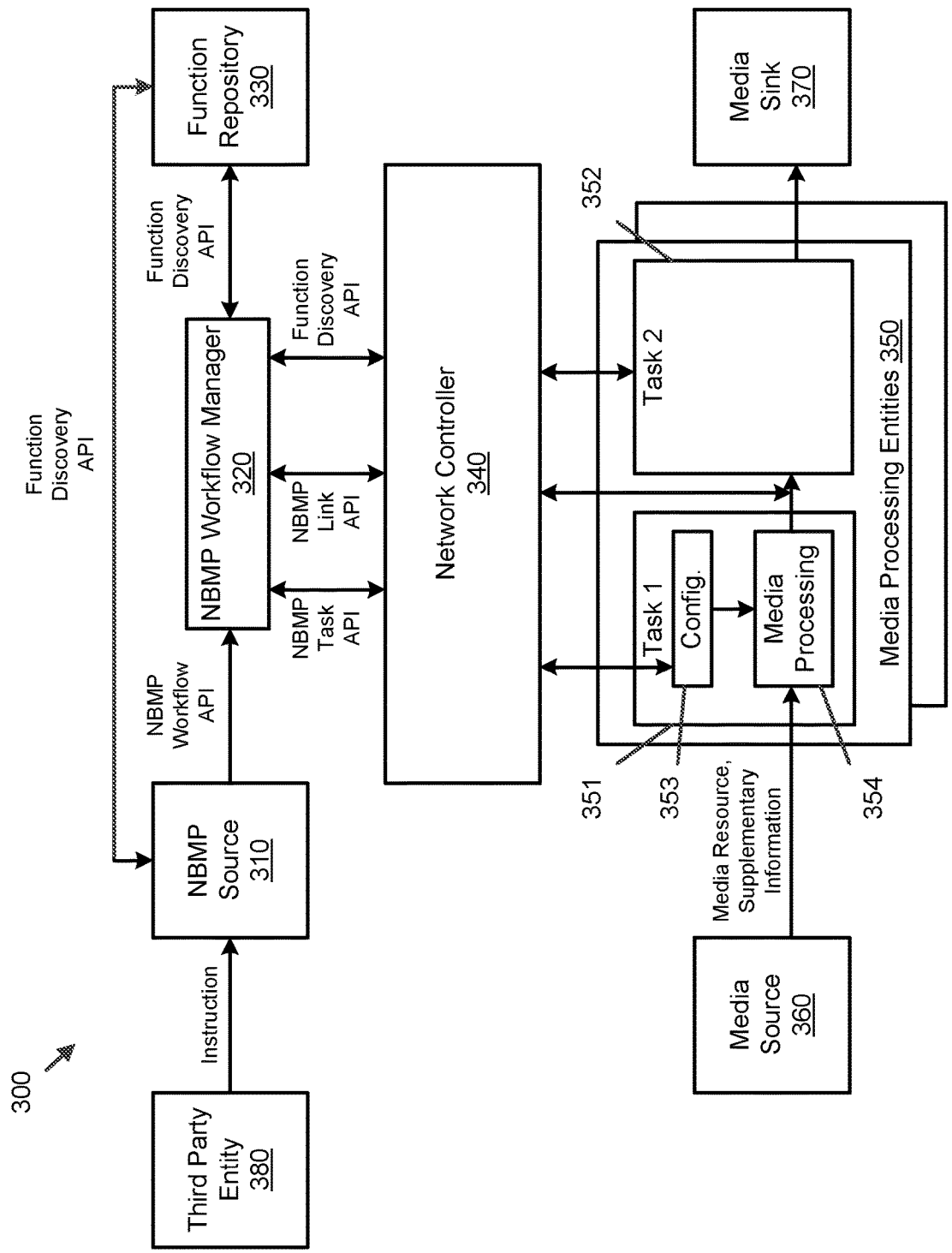
FIG. 3 is a block diagram of an NBMP system, according to embodiments.

FIG. 3 is a block diagram of an NBMP system 300, according to embodiments.

Referring to FIG. 3, the NBMP system 300 includes an NBMP source 310, an NBMP workflow manager 320, a function repository 330, a network controller 340, one or more media processing entities 350, a media source 360, and a media sink 370.

The NBMP source 310 may receive instructions from a third party entity 380, may communicate with the NBMP workflow manager 320 via an NBMP workflow API, and may communicate with the function repository 330 via a function discovery API. For example, the NBMP source 310 may send a workflow description document to the NBMP workflow manager 320, and may read a function description of functions that are stored in a memory of the function repository 330. The functions may include media processing functions such as, for example, functions of media decoding, feature point extraction, camera parameter extraction, projection method, seam information extraction, blending, post-processing, and encoding. The NBMP source 310 may include at least one processor and a memory that stores code configured to cause the at least processor to perform functions of the NBMP source 310.

The NBMP source 310 may request the NBMP workflow manager 320 to create workflow including tasks 351 and 352 to be performed by the one or more media processing entities 350, by sending the workflow description document to the NBMP workflow manager 320. The workflow description document may include descriptors, each of which may include parameters.

For example, the NBMP source 310 may select one or more of the functions stored in the function repository 330, and send, to the NBMP workflow manager 320, the workflow description document including the descriptors for describing details such as input and output data, the selected one or more of the functions, and requirements for a workflow. The workflow description document may further include a set of task descriptions and a connection map of inputs and outputs of the tasks 351 and 352 to be performed by the one or more of the media processing entities 350.

When the NBMP workflow manager 320 receives such information from the NBMP source 310, the NBMP workflow manager 320 may create the workflow by instantiating the tasks 351 and 352 based on function names and connecting the tasks 351 and 352 in accordance with the connection map.

Alternatively or additionally, the NBMP source 310 may request the NBMP workflow manager 320 to create a workflow by using a set of keywords. For example, the NBMP source 310 may send, to the NBMP workflow manager 320, the workflow description document including the set of the keywords that the NBMP workflow manager 320 may use to find appropriate one or more of the functions stored in the function repository 330. When the NBMP workflow manager 320 receives such information from the NBMP source 310, the NBMP workflow manager 320 may create the workflow by searching for the appropriate one or more of the functions, using the keywords that may be specified in a Processing Descriptor of the workflow description document, and by using other descriptors in the workflow description document to provision and connect the tasks 351 and 352.

The NBMP workflow manager 320 may communicate with the function repository 330 via a function discovery API, and may communicate with one or more of the media processing entities 350, through the network controller 340, via an NBMP task API, an NBMP link API, and a function discovery API. The NBMP workflow manager 320 may include at least one processor and a memory that stores code configured to cause the at least processor to perform functions of the NBMP workflow manager 320.

The NBMP workflow manager 320 may use the NBMP task API to setup, configure, manage, and monitor one or more of the tasks 351 and 352 of the workflow that is performable by the one or more media processing entities 350. In embodiments, the NBMP workflow manager 320 may use the NBMP task API to update and destroy the tasks 351 and 352. To configure, manage, and monitor the tasks 351 and 352 of the workflow, the NBMP workflow manager 320 may send messages, such as requests, to one or more of the media processing entities 350, wherein each message may have descriptors, each of which may include parameters. The tasks 351 and 352 may each include one or more media processing functions 354 and one or more configurations 353 for the one or more media processing functions 354.

In embodiments, after receiving the workflow description document from the NBMP source 310 that does not include a list of tasks (e.g., includes a list of keywords instead of a list of tasks), the NBMP workflow manager 320 may select the tasks based on descriptions of the tasks in the workflow description document, to search the function repository 330, via the function discovery API, to find appropriate one or more of the functions to run as the tasks 351 and 352 for the current workflow. For example, the NBMP workflow manager 320 may select the tasks based on keywords that are provided in the workflow description document. After the appropriate one or more of the functions are identified using the keywords or the set of task descriptions that is provided by the NBMP source 310, the NBMP workflow manager 320 may configure the selected tasks in the workflow by using the NBMP task API. For example, the NBMP workflow manager 320 may extract configuration data from information that is received from the NBMP source, and configure the tasks 351 and 352 based on the extracted configuration data.

The one or more media processing entities 350 may be configured to receive media content from the media source 360, process the received media content in accordance with the workflow that includes the tasks 351 and 352 and is created by the NBMP workflow manager 320, and output the processed media content to the media sink 370. The one or more media processing entities 350 may each include at least one processor and a memory that stores code configured to cause the at least processor to perform functions of the one or more media processing entities 350.

The network controller 340 may include at least one processor and a memory that stores code configured to cause the at least processor to perform functions of the network controller 340.

The media source 360 may include memory that stores media and may be integrated with or separate from the NBMP source 310. In embodiments, the NBMP workflow manager 320 may notify the NBMP source 310 and/or the media source 360 when a workflow is prepared, and the media source 360 may transmit media content to the one or more of the media processing entities 350 based on a notification that the workflow is prepared.

The media sink 370 may include at least one processor and at least one display that is configured to display media content that is processed by the one or more media processing entities 350.

The third party entity 380 may include at least one processor and a memory that stores code configured to cause the at least processor to perform functions of the third party entity 380.

As discussed above, messages from the NBMP source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include descriptors, each of which including parameters. In embodiments, communication between any of components of the NBMP system 300 using an API may include descriptors, each of which including parameters.

Harmonization of Workflow, Task and Function Hierarchal Objects and Aligning Them as REST Resources The current NBMP specification has a concept of template for task and functions, while defining a document for workflow description referred to as a workflow description document (WDD). Furthermore, it is not clear how task and function templates are converted to REST resources. The API documentation does not clearly define the exact syntax of resources, or how what resources are included in acknowledge of a API operation.

An NBMP specification according to embodiments aligns the concepts of logical items, JOSN objects/XML documents, and REST resources for the three items: workflow, task and function, and builds a harmonized and aligned structure for all there. Furthermore, it defines the resource format and constraints in acknowledgements, to make the interfaces true REST APIs.

Figure 4:
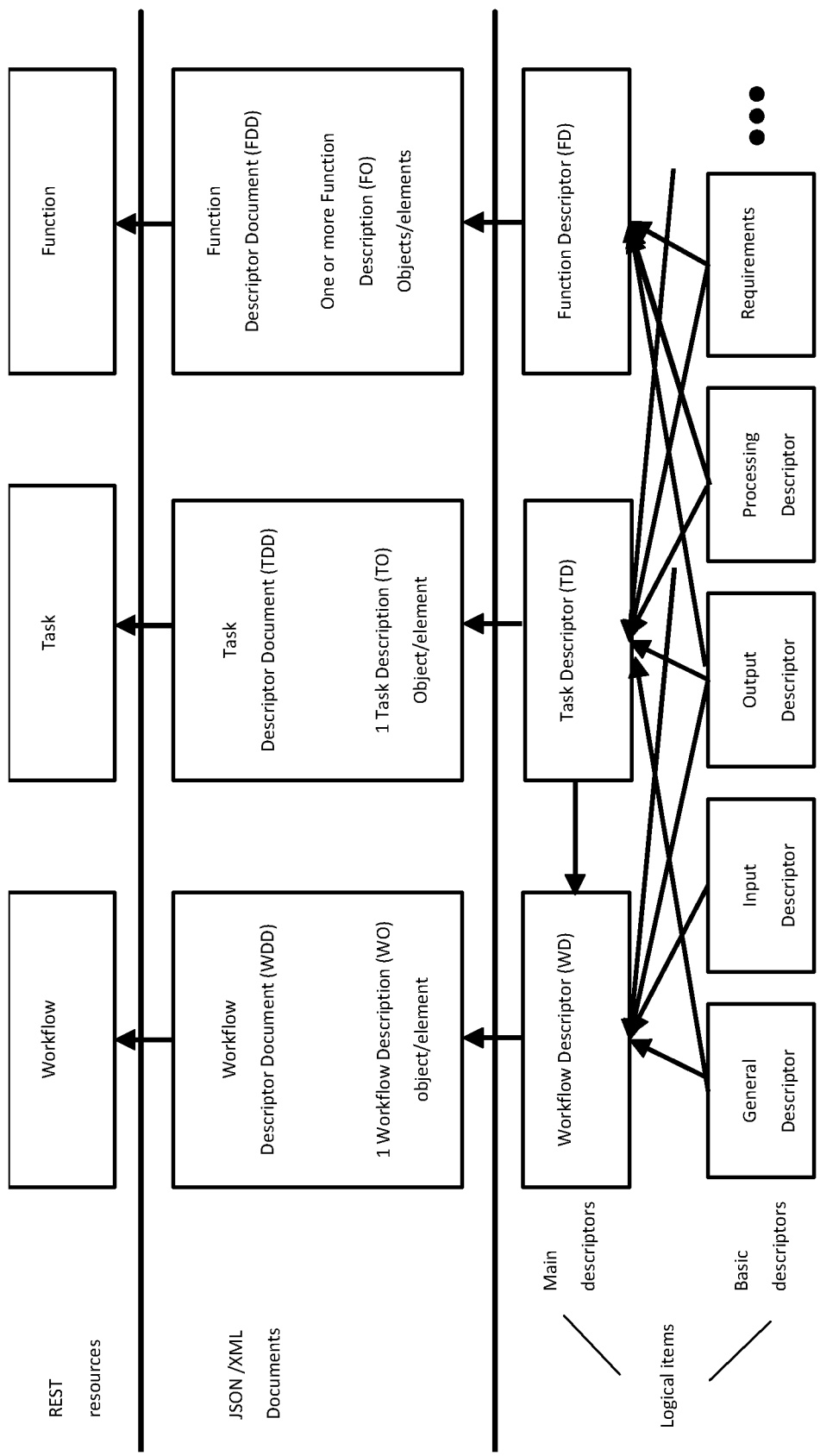
FIG. 4 is an updated logical structure of an NBMP system, according to embodiments.
Figure 5:
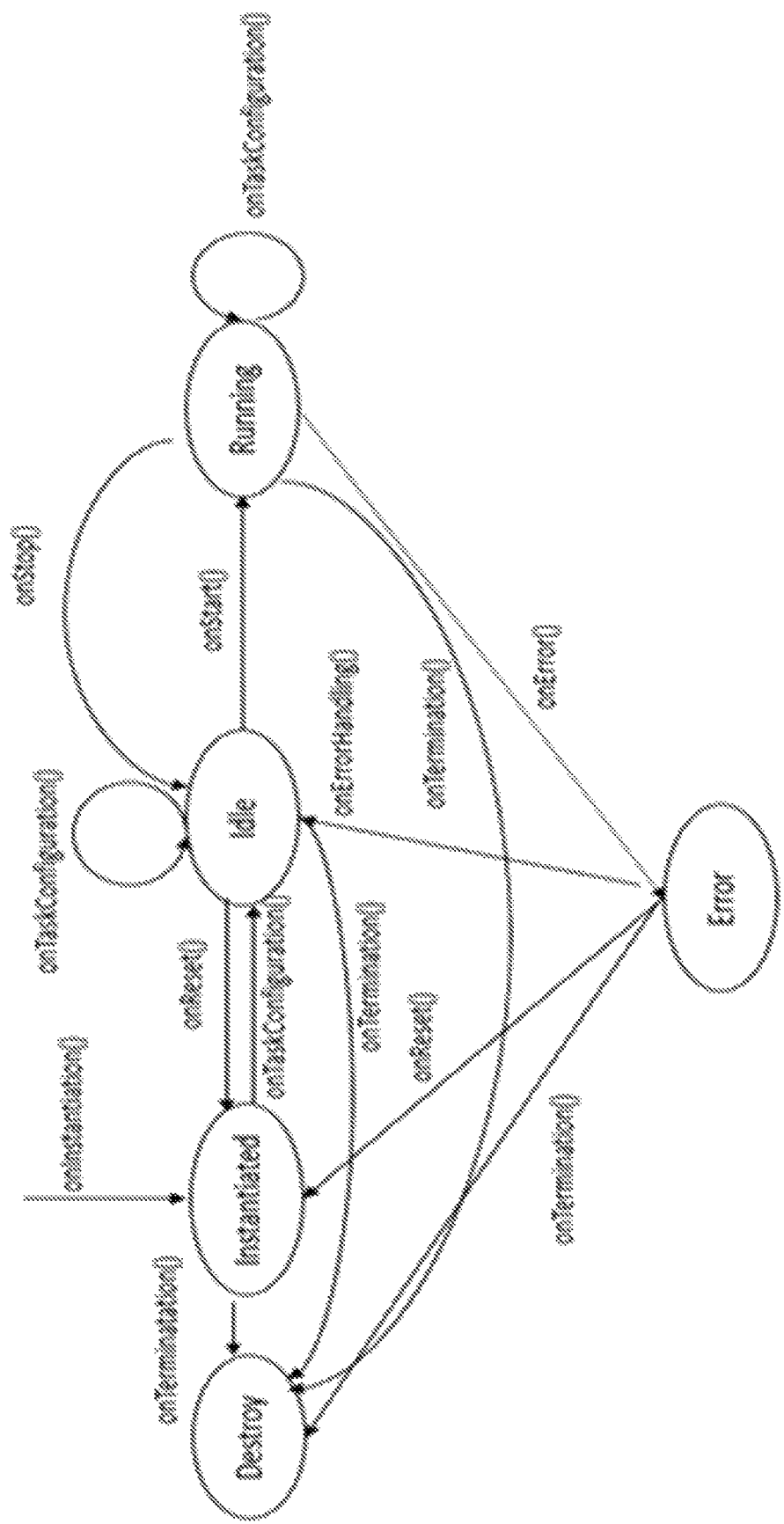
FIG. 5 is a diagram of an updated task life cycle, according to embodiments.

FIG. 4 shows an example of the relationship between the three entities, as logical items, JSON/XML documents and REST resources.

As can be seen in FIG. 4, logical items may be defined as descriptors. The three main descriptors may be a workflow desciptor (WD), a task descriptor (TD) and a function descriptor (FD). WD, TD, and FD may be built as combinations of the basic descriptors, such as a general descriptor, an input descriptor, an output descriptor, and others.

Workflow description objects (WO), task description objects (TO), and function description objects (FO) may be code realizations of the corresponding logic items, for example, WD, TD, and FD, in JSON or XML.

WDD, task description documents (TDD), and function description documents (FDD) may be documents containing WOs, TOs, and FOs. Documents may be objects in JSON and XML document in XML. Note that FDD may differ from WDD and TDD in the sense that it may include one or more FOs.

Workflow resources (WR), task resources (TR), and function resources (FR) may be WDD, TDD, or FDD includes URLs, and therefore may be identified as REST resources.

A major benefit of the example NBMP specification discussed above is that there may be a one to one relationship between main descriptors, documents, and REST resources, which may allow the system to be precisely specified, and may allow interoperable solutions to be built accordingly.

Designating the Main and Basic Descriptors as REST Resources

The current NBMP specification only enables accessing WR, TR and FR.

An NBMP specification according to embodiments may make WR, TR, and FR, REST resources, and also enable the main and basic descriptors to become a REST resource. Therefore, these descriptors may be individually accessed using the NBMP APIs. In this design, each main and basic descriptor object of an included WDD, TDD and FDD in any response may include include one "link" object, including a "ref" with value "self" and a URL indicating the location to that object.

Adding the Task Descriptor as a Component of Workflow Descriptor

The current NBMP specification does not include the Task Descriptor as part of workflow. It defines the relationship between them using ConnectionMap descriptor, which also includes the function indentifiers.

However, for an NBMP source to have a complete workflow diagram, an NBMP specification according to embodiments may include task descriptors also in the workflow descriptor, as shown for example in Table 1.

TABLE 1

| Adding Task Descriptor to Workflow Descriptor (WD) | | |
|---|---|---|
| Descriptor | Description | Cardinality |
| Scheme | Defines the scheme and specification that this WD is conforming to. | 1 |

TABLE 1-continued

| Adding Task Descriptor to Workflow Descriptor (WD) | | |
|---|---|---|
| Descriptor | Description | Cardinality |
| General | Parameters of the General descriptors are applicable except the following:<br>InputPorts<br>OutputPorts | 1 |
| Input | Parameters of the Input descriptor | 1 |
| Output | Parameters of the Output descriptor | 1 |
| Task | Parameters of the Task Descriptor | 0-N |
| Processing | Parameters of the Processing descriptor are applicable except the following:<br>URL | 0-1 |
| Requirement | Parameters of the Requirement descriptor | 1 |
| Client Assistance | Parameters of the Client Assistance descriptor | 0-1 |
| Failover | Parameters of the Failover descriptor | 0-1 |
| Monitoring | Parameters of the Monitoring descriptor are applicable except the following:<br>Variable | 0-1 |
| Assertion | Parameters of the Assertion descriptor | 0-1 |
| Reporting | Parameters of the Reporting descriptor | 0-1 |
| Notification | Parameters of the Notification descriptor | 0-1 |

In Table 1, an additional item, task descriptor, is added. With this addition, a workflow descriptor may describe the complete map and information about a created workflow.

Adding Media Source and Sink to Workflow DAG

The current NBMP specification does not include the media source 360 and sink 370 in its workflow directed acyclic graph (DAG) description.

An NBMP specification according to embodiments adds these elements to workflow DAG. A benefit of this approach is that the resource requirements for network connection between media source 360 and workflow in on hand, and between Workflow and media sink 370 can be described with the same DAG. This approach simplifies the documentation of requirements as well as the establishment and management of workflow by NBMP Workflow Manager.

Adding the Task's Life-Cycle State to General Descriptor

The current NBMP specification defines a life-cycle for tasks. The life-cycle has 5 states. However, the state of the current state of a Task in not described in any descriptors.

An NBMP specification according to embodiments builds based on REST APIs. Each REST resource must also capture its state. Therefore, the resource maintains the complete status of the logical item and there is no need to acquire the state from other data structure.

The NBMP specification according to embodiments adds a "state" parameter to general descriptor, which can be used to describe a task's state. This addition is shown in Table 2.

TABLE 2

| Addition of "state" parameter to General Descriptor | | | |
|---|---|---|---|
| Parameter Name | Description | Data Type | Cardinality |
| Id | Provides a unique identification in the scope of Repository/Workflow to the resource. | String | 1 |
| Name | Provides a name for identifying the resource. | String | 1 |
| Description | Provides a human readable description for the underlying resource. | String | 1 |

TABLE 2-continued

Addition of "state" parameter to General Descriptor

| Parameter Name | Description | Data Type | Cardinality |
|---|---|---|---|
| Brand | Provides category information for the underlying resource | String | 1 |
| Published Time | The date and time of publication of this document | String | 1 |
| Repository Location | Provides the Repository's URL that this resource or its corresponding Function Description is located | String | 1 |
| Priority | Provides priority information for the underlying resource. | Number | 0-1 |
| Execution Time | Provides execution time of the resource | String | 0-1 |
| InputPorts | Includes a map of port information where:<br>  1. Map key: Port Identifier<br>  2. Map value: an object with the following parameters:<br>    Stream Id in Input Descriptor<br>    Stream Data Type in Input Descriptor | Map | 1 |
| OutputPorts | Includes a map of port information where:<br>  3. Map key: Port Identifier<br>  Map value: an object which is structured:<br>    Stream Id in Output Descriptor<br>    Stream Data Type in Output Descriptor | Map | 1 |
| State | Providing the current state of the item in its life-cycle<br>The value of this parameter shall be one of the followings:<br>  Null<br>  Instantiated<br>  Idle<br>  Running<br>  In Error<br>  Destroyed | String | 1 |

As shown in Table 2, and as illustrated in FIG. 3, a new state "Null" may also added to the life-cycle to capture the initial state of a Task in its life cycle.

Designate NBMP APIs as REST APIs

The current NBMP specification is not clear how the API operations, requests and responses work. The documentation does not define interoperable APIs at this stage.

An NBMP specification according to embodiments designs NBMP APIs as REST API. Therefore, all API operations may be implemented as REST methods using HTTP 1.1, and the requests and responses may include REST resources, as shown in FIG. 2. Furthermore, the HTTP status code is used.

Tables 3, 4 and 5 describes the improved NBMP APIs, their requests and responses.

TABLE 3

Improved Workflow API Operations

| Operation | Description | Request resource requirements | Response Requirements |
|---|---|---|---|
| CreateWorkflow | Create a workflow | WR including information needed to create a workflow<br>The General descriptor's Id shall not be included in this request | If successful, shall include:<br>1) HTTP status code 2xx<br>2) Response's body with updated WR including:<br>  a) A value for General descriptor's Id<br>  b) Updated information including endpoint information where to send media data, metadata, and other information<br>If failed, shall include:<br>1) HTTP status codes 4xx or 5xx<br>2) Optionally, response's body with updated WR signaling failed descriptors or parameters |

TABLE 3-continued

Improved Workflow API Operations

| Operation | Description | Request resource requirements | Response Requirements |
|---|---|---|---|
| UpdateWorkflow | Update a previously created workflow | Updated WR with identical General's Id, previously received in CreateWorkflow's response | If successful, shall include:<br>1) HTTP status code 2xx<br>2) Response's body with updated WR including:<br>    General descriptor's Id identical to the one in the request<br>    Updated information including endpoint information where to send media data, metadata, and other information<br>If failed, shall include:<br>1) HTTP status codes 4xx or 5xx<br>2) Response's body with updated WR signaling failed descriptors or parameters |
| DeleteWorkflow | Terminate a previously created workflow | WR with identical General's Id, previously received in CreateWorkflow's response | If successful, shall include: HTTP status code 2xx<br>If failed, shall include:<br>1) HTTP status codes 4xx or 5xx<br>2) Response's body with updated WR signaling failed descriptors or parameters |
| RetrieveWorkflow | Retrieve a previously configured workflow | WR with identical General's Id, previously received in CresponsereateWorkflow's response | If successful, shall include:<br>1) HTTP status code 2xx<br>2) Response's body with updated WR including:<br>    General descriptor's Id identical to the one in the request<br>    Updated information including endpoint information where to send media data, metadata, and other information<br>If failed, shall include:<br>1) HTTP status codes 4xx or 5xx<br>2) Response's body with updated WR signaling failed descriptors or parameters |
| GetReports | Get reports for a previously configured workflow | WR with identical General's Id, previously received in CreateWorkflow's response and Report descriptors | If successful, shall include:<br>1) HTTP status code 2xx<br>2) Response's body with updated WR including:<br>    General descriptor s Id identical to the one in the request<br>    Updated report descriptors which were included in the request<br>If failed, shall include:<br>1) HTTP status codes 4xx or 5xx<br>2) Response's body with updated WR signaling failed descriptors or parameters |

TABLE 4

Improved Task Configuration Operations

| Operation | Description | Request Parameters | Response Requirements |
|---|---|---|---|
| CreateTask | Provision to run a task inside the media processing entity | TR including information needed to create a workflow The General descriptor's Id shall not be included in this request. | If successful, shall include:<br>3) HTTP status code 2xx<br>4) Response's body with updated TR including:<br>    a) A value for General descriptor's Id<br>    b) Updated information including endpoint information where to send media data, metadata, and other information<br>If failed, shall include:<br>3) HTTP status codes 4xx or 5xx<br>    Optionally, response's body with updated TR signaling failed descriptors or parameters |

TABLE 4-continued

Improved Task Configuration Operations

| Operation | Description | Request Parameters | Response Requirements |
|---|---|---|---|
| UpdateTask | Modify the task running inside the media processing entity | Updated TR with identical General's Id, previously received in CreateTask's response | If successful, shall include:<br>3) HTTP status code 2xx<br>4) Response's body with updated TR including:<br>  General descriptor's Id identical to the one in the request<br>  Updated information including endpoint information where to send media data, metadata, and other information<br>If failed, shall include:<br>3) HTTP status codes 4xx or 5xx<br>4) Response's body with updated TR signalling failed descriptors or parameters |
| GetTask | Retrieve task configuration information | TR with identical General's Id, previously received in CreateTask's response | If successful, shall include:<br>3) HTTP status code 2xx<br>4) Response's body with updated TR including:<br>  General descriptor's Id identical to the one in the request<br>  Updated report descriptors which were included in the request<br>If failed, shall include:<br>3) HTTP status codes 4xx or 5xx<br>  Response's body with updated TR signalling failed descriptors or parameters |
| DeleteTask | Request to de-provision the task inside the media processing entity | TR with identical General's Id, received in CreateTask's response. | If successful, shall include:<br>  1. HTTP status code 2xx<br>If failed, shall include:<br>  HTTP status codes 4xx or 5xx<br>  Response's body with updated TR signalling failed descriptors or parameters |

TABLE 5

Improved Function Discovery API Operations

| Operation | Description | Request Parameters | Response |
|---|---|---|---|
| DiscoverAllFunctions | Discover all functions in the function repository | Query string shall be empty, i.e. only '?' added to the end of Function Repository's URL | If successful, shall include:<br>1) HTTP status code 2xx<br>2) Response's body including exactly one Function Description Document (FDD) containing FDs of all Function in Repository<br>If failed, shall include:<br>1) HTTP status codes 4xx or 5xx<br>If no Function is found in the repository, the response shall be considered successful and an empty FSD shall be included in the body. |
| DiscoverSpecificFunction | Discover a set of functions matching a given string | Query string shall include the key-value pairs describing the desired properties of the target Function. | If successful, shall include:<br>1) HTTP status code 2xx<br>2) Response's body including exactly one Function Description Document (FDD) of all Function in Repository with the matching values per key<br>If failed, shall include:<br>2) HTTP status codes 4xx or 5xx<br>If search is performed and no Function is found, the response shall be considered successful and an empty FSD shall be included in the body. |

In Tables 3-5, the request and response body (data) may correspond to the REST resources of FIG. 2.

Additionally, to make the response a complete REST resource, an NBMP specification according to embodiments may specify that the included WDD in any response may include one "link" object, including a "ref" with value "self" and a URL indicating the location to WDD. In addition, the included TDD in any response may include one "link" object, including a "ref" with value "self" and a URL indicating the location to TDD. Similarly, each included FDD in any response may include one "link" object, including a "ref" with value "self" and a URL indicating the location to FDD. Further, in every included FDD in any response, each Function Descriptor Object (FDO) may include one "link" object, including a "ref" with value "self" and a URL indicating the location of each FDO.

HTTP "Query String"-Based Search for Function Discovery

The current NBMP specification describes discovery operations. But it does not define the format and protocol of the operations. It also specifies that two keys are used for Function search: either by "identifier" or by "name", but not the combination of them.

An NBMP specification according to embodiments improves the discovery operations by using HTTP query string and combination of key-value pairs. So it defines a simple method (HTTP GET) to implement the operations. This allows the combination of keys to be used in the search. In addition, an NBMP specification according to embodiments adds more keys to the search parameters. Therefore, better search can be performed using different aspects of stored Function in the repository.

According to embodiments, a discovery query and a query string may be used to perform a search. The discovery query is to discover one or more Functions in Function Repository by the properties described in the query. The query string may be used to describe these properties; and the query string may include of a set of key-value pairs, separated by a single '&' character. In each key-value pair, the key and value shall be separated by single '=' character. A query string may be added to the end of resource URL after a single "?" character.

Table 7 lists examples of supported keys in the query string.

TABLE 6

Function query's keys

| Query keys | Descriptor | Parameter |
|---|---|---|
| id | General | Identifier |
| name | General | Name |
| description | General | Description |
| brand | General | Brand |
| keywords | Processing | Keywords |

Figure 6:
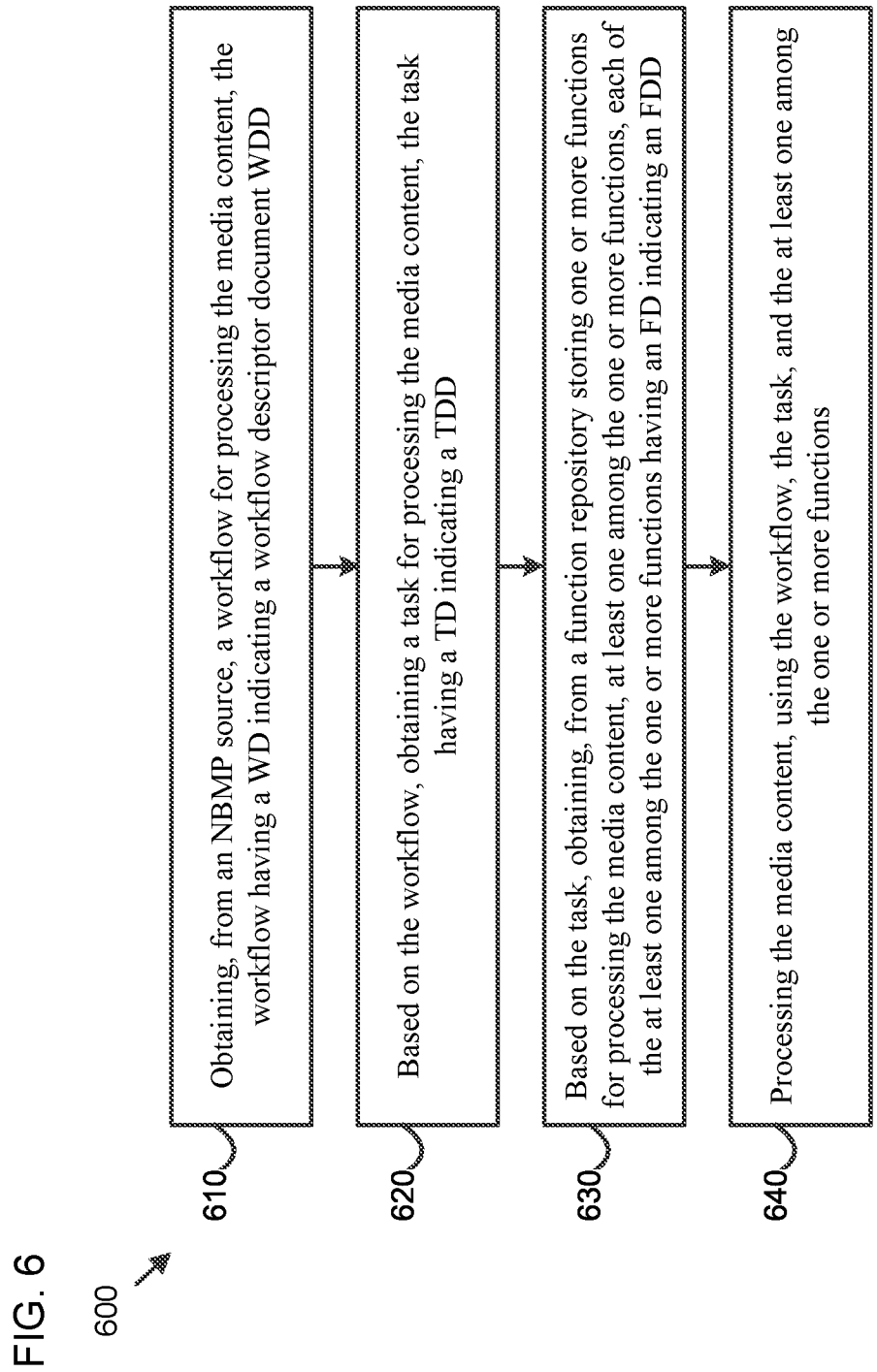
FIG. 6 is a flowchart of a method of processing media content in MPEG NBMP, according to embodiments.

FIG. 6 is a flowchart of a method 600 of processing media content in MPEG NBMP, according to embodiments. In some implementations, one or more process blocks of FIG. 6 may be performed by the platform 120 implementing the NBMP system 300. In some implementations, one or more process blocks of FIG. 6 may be performed by another device or a group of devices separate from or including the platform 120 implementing the NBMP system 300, such as the user device 110.

As shown in FIG. 6, in operation 610, the method 600 includes obtaining, from an NBMP source, for example NBMP source 310, a workflow for processing the media content, the workflow having a WD indicating a workflow descriptor document WDD.

In operation 620, the method 600 includes, based on the workflow, obtaining a task for processing the media content, the task having a TD indicating a TDD.

In operation 630, the method 600 includes, based on the task, obtaining at least one among the one or more functions from a function repository storing one or more functions for processing the media content, for example function repository 330, wherein each of the at least one among the one or more functions has an FD indicating an FDD.

In operation 640, the method 600 includes processing the media content, using the workflow, the task, and the at least one among the one or more functions.

In an embodiment, the workflow may include a workflow representational state transfer (REST) resource (WR), the task may include a task REST resource (TR), and the at least one among the one or more functions may include a function REST resource.

In an embodiment, the WD, the TD, and the FD may be constructed from one or more general descriptors.

In an embodiment, the WDD may include a workflow description object (WO), the TDD may include a task description object (TO), and the FDD may include at least one function description object (FO).

In an embodiment, the WO, the TO, and the at least one FO include at least one JavaScript Object Notation (JSON) object or at least one Extensible Markup Language (XML) element.

In an embodiment, the WDD may include first link object including a first uniform resource locator (URL) indicating a location of the WDD, the TDD may include a second link object including a second uniform resource locator (URL) indicating a location of the TDD, and the FDD may include a third link object including a third uniform resource locator (URL) indicating a location of the FDD.

In an embodiment, the TD may include a state descriptor indicating a state of the task.

In an embodiment, the state descriptor may indicate that the state of the task is a null state.

In an embodiment, the at least one among the one or more functions may be retrieved from the function repository using a hyper text transfer protocol (HTTP) query including a search key and a search value corresponding to the at least one among the one or more functions.

In an embodiment, the search value may include at least one from an identifier, a name, a description, a brand, or a keyword associated with the at least one among the one or more functions.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Figure 7:
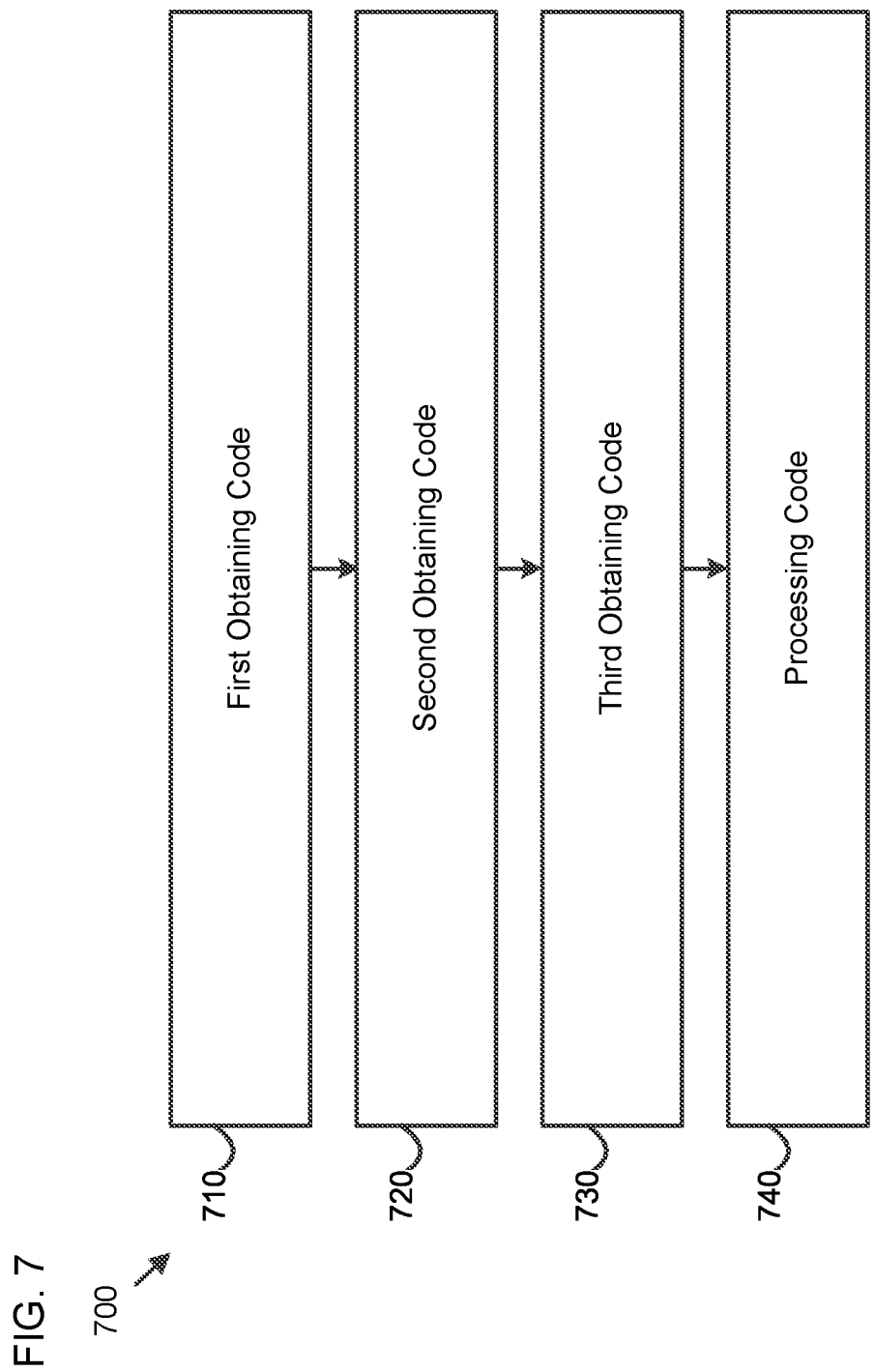
FIG. 7 is a block diagram of an apparatus for processing media content in MPEG NBMP, according to embodiments.

FIG. 7 is a diagram of an apparatus 700 for processing media content in MPEG NBMP, according to embodiments. As shown in FIG. 7, the apparatus 700 includes first obtaining code 710, second obtaining code 720, third obtaining code 730, and processing code 740.

The first obtaining code 710 may be configured to cause the at least one processor to obtain, from an NBMP source such as NBMP source 310, a workflow for processing the media content, the workflow having a workflow descriptor (WD) indicating a workflow descriptor document (WDD).

The second obtaining code 720 may be configured to cause the at least one processor to obtain, based on the workflow, a task for processing the media content, the task having a task descriptor (TD) indicating a task descriptor document (TDD).

The third obtaining code 730 may be configured to cause the at least one processor to obtain, based on the task, at least one among the one or more functions from a function repository storing one or more functions for processing the media content, for example function repository 330, wherein each of the at least one among the one or more functions has an FD indicating an FDD.

The processing code 740 may be configured to cause the at least one processor to process the media content, using the workflow, the task, and the at least one among the one or more functions.

In an embodiment, the workflow may include a workflow representational state transfer (REST) resource (WR), the task may include a task REST resource (TR), and the at least one among the one or more functions may include a function REST resource.

In an embodiment, the WD, the TD, and the FD may be constructed from one or more general descriptors.

In an embodiment, the WDD may include a workflow description object (WO), the TDD may include a task description object (TO), and the FDD may include at least one function description object (FO).

In an embodiment, the WO, the TO, and the at least one FO include at least one JavaScript Object Notation (JSON) object or at least one Extensible Markup Language (XML) element.

In an embodiment, the WDD may include first link object including a first uniform resource locator (URL) indicating a location of the WDD, the TDD may include a second link object including a second uniform resource locator (URL) indicating a location of the TDD, and the FDD may include a third link object including a third uniform resource locator (URL) indicating a location of the FDD.

In an embodiment, the TD may include a state descriptor indicating a state of the task.

In an embodiment, the state descriptor may indicate that the state of the task is a null state.

In an embodiment, the at least one among the one or more functions may be retrieved from the function repository using a hyper text transfer protocol (HTTP) query including a search key and a search value corresponding to the at least one among the one or more functions.

In an embodiment, the search value may include at least one from an identifier, a name, a description, a brand, or a keyword associated with the at least one among the one or more functions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing media content in Moving Picture Experts Group (MPEG) Network Based Media Processing (NBMP), the method being performed by at least one processor, and the method comprising:
obtaining, from an NBMP source, a workflow for processing the media content, the workflow having a workflow descriptor (WD) indicating a workflow descriptor document (WDD);
based on the workflow, obtaining a task for processing the media content, the task having a task descriptor (TD) included in the WD of the workflow and indicating a task descriptor document (TDD), wherein the TD includes a general descriptor including a state parameter which indicates state of the task from among five states, and wherein the five states comprise an instantiated state, an idle state, a running state, an in error state, and a destroyed state;
based on the task, obtaining, from a function repository storing one or more functions for processing the media content, at least one among the one or more functions, each of the at least one among the one or more functions having a function descriptor (FD) indicating a function descriptor document (FDD); and
processing the media content, using the workflow, the task, and the at least one among the one or more functions,
wherein the workflow further comprises a Connection-Map descriptor that is separate from the TD and defines one or more relationships between at least the task and the at least one among the one or more functions, and
wherein the WD comprises a plurality of descriptors, in addition to the TD, the plurality of descriptors including a scheme descriptor, a general descriptor, an input descriptor, an output descriptor, a processing descriptor, and a requirement descriptor.

2. The method of claim 1, wherein the workflow comprises a workflow representational state transfer (REST) resource (WR),
wherein the task comprises a task REST resource (TR), and
wherein the at least one among the one or more functions comprises a function REST resource.

3. The method of claim 1, wherein the WD, the TD, and the FD are constructed from one or more general descriptors.

4. The method of claim 1, wherein the WDD includes a workflow description object (WO),
wherein the TDD includes a task description object (TO), and
wherein the FDD includes at least one function description object (FO).

5. The method of claim 4, wherein the WO, the TO, and the at least one FO comprise at least one JavaScript Object Notation (JSON) object or at least one Extensible Markup Language (XML) element.

6. The method of claim 1, wherein the WDD includes first link object including a first uniform resource locator (URL) indicating a location of the WDD,
wherein the TDD includes a second link object including a second uniform resource locator (URL) indicating a location of the TDD, and
wherein the FDD includes a third link object including a third uniform resource locator (URL) indicating a location of the FDD.

7. The method of claim 1, wherein the TD includes a state descriptor indicating a state of the task.

8. The method of claim 7, wherein the state descriptor indicates that the state of the task is a null state.

9. The method of claim 1, wherein the at least one among the one or more functions is retrieved from the function repository using a hyper text transfer protocol (HTTP) query including a search key and a search value corresponding to the at least one among the one or more functions.

10. The method of claim 9, wherein the search value comprises at least one from an identifier, a name, a description, a brand, or a keyword associated with the at least one among the one or more functions.

11. An apparatus for processing media content in Moving Picture Experts Group (MPEG) Network Based Media Processing (NBMP), the apparatus comprising:
at least one memory configured to store program code; and
at least one processor configured to read the program code and operate as instructed by the program code, the program code comprising:
first obtaining code configured to cause the at least one processor to obtain, from an NBMP source, a workflow for processing the media content, the workflow having a workflow descriptor (WD) indicating a workflow descriptor document (WDD);
second obtaining code configured to cause the at least one processor to obtain, based on the workflow, a task for processing the media content, the task having a task descriptor (TD) included in the WD of the workflow and indicating a task descriptor document (TDD), wherein the TD includes a general descriptor including a state parameter which indicates state of the task from among five states, and wherein the five states comprise an instantiated state, an idle state, a running state, an in error state, and a destroyed state;

third obtaining code configured to cause the at least one processor to obtain, based on the task, from a function repository storing one or more functions for processing the media content, at least one among the one or more functions, each of the at least one among the one or more functions having a function descriptor (FD) indicating a function descriptor document (FDD);
processing code configured to cause the at least one processor to process the media content, using the workflow, the task, and the at least one among the one or more functions,
wherein the workflow further comprises a Connection-Map descriptor that is separate from the TD and defines one or more relationships between at least the task and the at least one among the one or more functions, and
wherein the WD comprises a plurality of descriptors, in addition to the TD, the plurality of descriptors including a scheme descriptor, a general descriptor, an input descriptor, an output descriptor, a processing descriptor, and a requirement descriptor.

12. The apparatus of claim 11, wherein the workflow comprises a workflow representational state transfer (REST) resource (WR),
wherein the task comprises a task REST resource (TR), and
wherein the at least one among the one or more functions comprises a function REST resource.

13. The apparatus of claim 11, wherein the WD, the TD, and the FD are constructed from one or more general descriptors.

14. The apparatus of claim 11, wherein the WDD includes a workflow description object (WO),
wherein the TDD includes a task description object (TO), and
wherein the FDD includes at least one function description object (FO).

15. The apparatus of claim 14, wherein the WO, the TO, and the at least one FO comprise at least one JavaScript Object Notation (JSON) object or at least one Extensible Markup Language (XML) element.

16. The apparatus of claim 11, wherein the WDD includes first link object including a first uniform resource locator (URL) indicating a location of the WDD,
wherein the TDD includes a second link object including a second uniform resource locator (URL) indicating a location of the TDD, and
wherein the FDD includes a third link object including a third uniform resource locator (URL) indicating a location of the FDD.

17. The apparatus of claim 11, wherein the TD includes a state descriptor indicating a state of the task.

18. The apparatus of claim 11, wherein the at least one among the one or more functions is retrieved from the function repository using a hyper text transfer protocol (HTTP) query including a search key and a search value corresponding to the at least one among the one or more functions.

19. The apparatus of claim 18, wherein the search value comprises at least one from an identifier, a name, a description, a brand, or a keyword associated with the at least one among the one or more functions.

20. A non-transitory computer-readable medium storing instructions that, when executed by at least one processor of an apparatus for processing media content in Moving Picture Experts Group (MPEG) Network Based Media Processing (NBMP), cause the at least one processor to:

obtain, from an NBMP source, a workflow for processing the media content, the workflow having a workflow descriptor (WD) indicating a workflow descriptor document (WDD);

based on the workflow, obtain a task for processing the media content, the task having a task descriptor (TD) included in the WD of the workflow and indicating a task descriptor document (TDD), wherein the TD includes a general descriptor including a state parameter which indicates state of the task from among five states, and wherein the five states comprise an instantiated state, an idle state, a running state, an in error state, and a destroyed state;

based on the task, obtain, from a function repository storing one or more functions for processing the media content, at least one among the one or more functions, each of the at least one among the one or more functions having a function descriptor (FD) indicating a function descriptor document (FDD); and process the media content, using the workflow, the task, and the at least one among the one or more functions, wherein the workflow further comprises a Connection-Map descriptor that is separate from the TD and defines one or more relationships between at least the task and the at least one among the one or more functions, and wherein the WD comprises a plurality of descriptions, in addition to the TD, the plurality of descriptions including a scheme descriptor, a general descriptor, an input descriptor, an output descriptor, a processing descriptor, and a requirement descriptor.

* * * * *